United States Patent [19]

Liedloff et al.

[11] Patent Number: 5,708,125
[45] Date of Patent: Jan. 13, 1998

[54] PROCESS FOR PRODUCING PRECONDENSATES OF PARTIALLY CRYSTALLINE OR AMORPHOUS, THERMOPLASTICALLY PROCESSABLE, PARTIALLY AROMATIC POLYAMIDES OR COPOLYAMIDES

[75] Inventors: Hanns-Jörg Liedloff; Manfred Schmid, both of Domat/Ems, Switzerland

[73] Assignee: EMS-Inventa AG, Zurich, Switzerland

[21] Appl. No.: 498,560

[22] Filed: Jul. 6, 1995

[30] Foreign Application Priority Data

Jul. 14, 1994 [DE] Germany ............ 44 24 949.7

[51] Int. Cl.$^6$ ............ C08G 69/08; C08G 73/10
[52] U.S. Cl. ............ 528/310; 528/322; 528/335; 528/339; 528/347; 528/348; 528/349; 525/420; 525/432
[58] Field of Search ............ 528/348, 347, 528/335, 339, 310, 322; 525/420, 432

[56] References Cited

U.S. PATENT DOCUMENTS

| 3,454,536 | 7/1969 | Schade | 528/347 |
|---|---|---|---|
| 3,900,450 | 8/1975 | Jaswal et al. | 528/335 |
| 4,163,101 | 7/1979 | Schade et al. | 528/347 |
| 4,465,821 | 8/1984 | Nielinger et al. | 528/335 |
| 4,540,772 | 9/1985 | Pipper et al. | 528/335 |
| 4,831,108 | 5/1989 | Richardson et al. | 528/335 |
| 4,963,646 | 10/1990 | Galland et al. | 528/347 |
| 5,098,940 | 3/1992 | Brooks | 525/420 |
| 5,177,178 | 1/1993 | Thullen et al. | 528/339.3 |

FOREIGN PATENT DOCUMENTS

| 0410649 | 7/1990 | European Pat. Off. |
| 43 29 676 C 2 | 9/1993 | Germany |

*Primary Examiner*—P. Hampton-Hightower
*Attorney, Agent, or Firm*—Browdy and Neimark

[57] ABSTRACT

A process for producing precondensates of partially crystalline or amorphous, thermoplastically processable, partially aromatic polyamides or copolyamides, and the use of the higher molecular weight of polyamides, accessible from the precondensates, for producing molding compositions, which are further processable by means of suitable processing techniques, involves the control of temperature and water vapor partial pressure, in a batch process.

5 Claims, No Drawings ature is more favorable in terms of 45

PROCESS FOR PRODUCING PRECONDENSATES OF PARTIALLY CRYSTALLINE OR AMORPHOUS, THERMOPLASTICALLY PROCESSABLE, PARTIALLY AROMATIC POLYAMIDES OR COPOLYAMIDES

FIELD OF THE INVENTION

The invention relates to an improved process for producing polymers of partially crystalline or amorphous, thermoplastically processable, partially aromatic polyamides or copolyamides, and to the use of the resultant higher molecular weight polyamides, accessible from the precondensates, for producing molding compositions that are further processable by means of suitable thermoplastic processing techniques.

BACKGROUND

Partially aromatic polyamides with terephthalamide and respectively isophthalamide units respectively have already been known since the beginning of the so-called "nylon age", in the form of their simply constructed representatives, for instance in the form of poly(hexamethylene terephthalamide). Nevertheless, it has taken another three to four decades of development until these polymers, which are extraordinarily interesting in terms of their properties, and recovering them, have become commercially available. Not until the 1970s could these products establish themselves on the market, in ever-increasing numbers of variants, with a steadily increasing growth rate.

The reason for the late appearance, compared with nylon-6[1], -66, -11 and -12, of the partially aromatic polyamides is that their production makes comparatively high and sometimes extreme demands of the process and of the necessary equipment or systems. For the high-melting, partially crystalline poly(terephthaiamides), suitable commercial methods and suitable equipment were not even available until the mid-1980s.

[1] In this specification, the abbreviation PA is sometimes used for "polyamide"; therefore, nylon-6, nylon-66, etc. may be referred to as PA-6, PA-66, etc.

In amorphous, partially aromatic polyamides, which are accessible in practically unlimited versatility from aromatic and optionally aliphatic dicarboxylic acids, aliphatic, cycloaliphatic or araliphatic diamines, and lactams or ω-amino acids, the situation is more favorable in terms of the production process and the equipment. In that case, recourse can be made to the proven batch processes in conventional agitated autoclaves. Presently, virtually all the commercially available amorphous polyamides are produced industrially in batches, in suitably modified or expanded systems.

Suitably, a so-called dissolver is connected to the input side of the polycondensation reactor, within which approximately equimolar quantities of dicarboxylic acid(s) and diamine(s) are converted into aqueous, possibly lactam-containing "nylon"-salt solutions. Such solutions can be controlled as to their composition by using simple acid/base titration methods and can optionally be adjusted to the predetermined ratio of the amine and acid components by adding the missing proportion of acid or amine.

Batch processes generally have the advantage that a change in products can be done very quickly and without major effort. In this sense, batch processes, in contrast to fully continuous methods, offer a high degree of flexibility.

However, batchwise production of amorphous partially aromatic polyamides is subject to limitations in terms of the attainable average molecular weight. Because of the typically very high structure-dictated melting viscosities of such polyamides, their polycondensation must be stopped at a very early stage, to enable discharging the melt entirely from the autoclaves and, for example processing it into granular material. In addition, to overcome the often difficult problems of discharge, monofunctional cocomponents act as chain regulators (or chain stoppers), such as monocarboxylic acids or monoamines, are used in the polycondensation.

Limiting the average molecular weight of these polymers to comparatively low values necessarily has a negative effect on their mechanical properties, technical processing properties, and other applications-oriented properties.

Meanwhile, there have been numerous attempts to circumvent these difficulties. Recent proposals involve the application of two-stage methods, with a batchwise or continuously performed production of precondensates or prepolymers, and a final reaction stage that produces the final polymer. With amorphic partially aromatic polyamides, this latter stage typically comprises the condensation of the precondensate melt by means of continuous-operation double- or single-screw extruders, with a relatively short residence time in the extruder. The condensation of the precondensates into high-molecular polyamides is carried out in these extruders, which are provided with one or more degassing openings and which can optionally be operated at reduced pressure. In this connection European Patent Disclosure EP A 410 649 and U.S. Pat. No. 4,963,646 are particularly informative. A batchwise process for precondensate (prepolymer) production in combination with the above-described continuous-operation final reaction stage is proposed in both of these references. In EP A 410 649, carboxyl-terminated polyamide prepolymers, with approximately equimolar quantities of diamine, are condensed in a double-screw extruder, with the splitoff of water, to make the high-molecular polyamide. To this end, a quantitatively controlled stream of prepolymer is continuously fed to the extruder; the prepolymer after being melted and compressed, mixes with the diamine metered by means of a pump, and is fed through a reaction zone and an ensuing degassing zone operated at reduced pressure. After passing through a further compression zone, the high-molecular polymer melt emerges through a nozzle, is pulled off in the form of a strand, and is cooled and granulated.

U.S. Pat. No. 4,963,646 employs a similar mode of operation to EP A 410 649, but with the single difference that here a carboxyl-terminated polyamide prepolymer is reacted with an otherwise indentically structured amino-terminated polyamide prepolymer. In the case of U.S. Pat. No. 4,963,646 as well, the condensation to the high-molecular polyamide is done in an extruder with a degassing zone; not only double-screw extruders but also single-screw extruders can be used for this purpose.

Both of these patent disclosures evade the aforementioned problems involved with the single-stage batchwise production of amorphous partially aromatic polyamides. Each of the methods described are difficult, however, in the sense that the extruder must be supplied with two components in quantitative ratios that must be adhered to exactly and that are determined by the stoichiometry. This mode of operation thus makes extreme, and technically virtually unattainable, demands of the precision of two feed units that must be adapted precisely to one another. An even more difficult factor is that the extruder, with the homogeneous mixing of the two components and their polycondensation, must take on two tasks one after the other. The temporal or spatial separation of these events along the extruder screw(s), given the relatively short available residence time of normally approximately 1 to 5 minutes in conventional extruders, is not easy to attain.

Problems of a similar nature to those occurring with the amorphous polyamides with terephthalamide and/or isophthalamide units also occur in the partially crystalline polyamides based on m-Xylylene diamine/adipic acid (PA-MXDA.6) or p-Xylylene diamine/adipic acid (PA-PXDA.6), and the copolyamides derived from them with arbitrary additional dicarboxylic acid and/or dimnine components. For the production of the most significant product of this series of partially aromatic polyamides, PA-MXDA.6, a conventional batch process is only minimally suitable, especially when it is important to produce high-viscosity material with adequately high viscosity. Because of the high melting point of PA-MXDA.6, the postcondensation of low-viscosity material in solid phase can be employed here at comparatively high process temperatures. With lower-melting-point copolyamides with MXDA units, however, this method has its limits.

Continuous methods for producing precondensates of amorphous or partially crystalline, partially aromatic polyamides have also been proposed, in order to overcome the difficulties in the production of these polymers.

One such process, which is also said to be applicable to the production of other condensation polymers, is the subject of U.S. Pat. No. 4,831,108. The sequence of process steps described there includes, for polyamides, the production of aqueous salt solution, a prereaction of these solutions in a tubular reactor through which there is a continuous flow, which reactor is operated at temperatures of around 300° C. and, in order to maintain a closed liquid phase, at pressures above the respective water vapor pressure, and—in the next step—the controlled pressure relief of the prereacted solutions, while further condensations take place along with the formation of stable dispersions of polymer particles in a continuous vapor phase. These dispersions are each delivered preferably directly to a double-screw extruder and there polycondensed to high-molecular polyamide (or other condensation polymers).

The present applicant, in the specification of U.S. Pat. No. 5,098,940, provides additional improvement on the process of U.S. Pat. No. 4,831,108; whereby the salt solutions of diamines and dicarboxylic acids are preconcentrated by evaporating off some of the water. The prereaction of the salt solutions is also no longer done in one tubular reactor but rather in two tubular reactors connected in series. What must be considered a particularly fundamentally novel feature compared with the process of U.S. Pat. No. 4,831,108, however, is the feature in U.S. Pat. No. 5,098,940 that in the formation of the dispersions of polymer particles in a pressure-relieved continuous vapor phase, some of the water is let off in countercurrent via a regulating valve. Finally, in U.S. Pat. No. 5,098,940, further water is withdrawn from the dispersion of polymer particles and water vapor in the extruder, by degassing counter to the feed direction, before the polycondensation to high-molecular polyamides takes place downstream.

The process of U.S. Pat. Nos. 4,831,108 and 5,098,940 is extraordinarily elaborate and complex, especially with respect to regulating the very rapid process steps, following directly on one another, in the tubular reactor, in the "dispersion phase" and in the extruder. The direct coupling of all the process steps makes disruptions in operation still more difficult to control and avoid; even rearrangements and different products must be considered to be disruptions of this kind. With a view to a change in products, fully continuous methods are accordingly not as flexible as batch processes.

SUMMARY OF THE INVENTION

An object of the present invention is therefore to provide a process for producing precondensates of partially crystalline or amorphous, thermoplastically processable, partially aromatic polyamides which neither has the disadvantages of the batch processes in the prior art nor the limitations of continuous process terms of rapidly changing from one product together, but which makes use of the fundamental advantages of a batch process.

The invention therefore relates in particular to a multi-step batch process that contains the following steps a) through e):

a) a salt forming phase for producing salt(s) of diamine(s) and dicarboxylic acid(s) in a 5 to 50 weight % aqueous solution containing the components, which is carried out in an agitatable and inert autoclave and optionally with partial prereaction to make low-molecular oligoamides at temperatures between 120° C. and 220° C. and at pressures of up to 23 bar;

b) optionally, the transfer of the solution from step a) to a second reaction vessel or an agitated autoclave, under the conditions prevailing at the completion of the formation of the polyamide precondensate to be prepared;

c) the reaction phase, during which the conversion to the precondensates is continued, by heating the reactor content to a predetermined temperature and controlled adjustment of the water vapor partial pressure to the predetermined value, which is maintained by the controlled venting of water vapor or optionally controlled feeding in of water vapor from a water vapor generator communicating with the autoclave;

d) a stationary stage to be maintained for at least 10 minutes, in which the temperature of the reactor contents and the water vapor partial pressure—the latter by employing the provisions listed in phase c) above—are adjusted in controlled fashion, each to values which are contemplated for the transfer of the precondensates to the ensuing process step, with the specification that in the case of precondensation of partially crystalline polyamides or copolyamides having a melting point of 280° C. and higher (maximum melting point, measured by differential scanning calorimetry), the temperature of the reactor content during phase d) and phase c) must not exceed 265° C., and that for the aforementioned partially crystalline polyamides or copolyamides during phases d) and c), the values of Table I must be adhered to with respect to the dependency of the minimum water vapor partial pressure $P_{H2O}$ (minimum) to be employed on the temperature of the reactor content and on the amide group concentration of the polymer (in mmol/g, calculated for a condensed-out polymer with an average molecular weight of at least 5000 g/mol);

TABLE 1

| | Amide Concentration (AC) [mmol/g] | Temperature range [°C.] | $P_{H2O}$ (minimum) [bar] |
|---|---|---|---|
| I | 10 > AC > 8 | 235–250 | 16 |
| II | 10 > AC > 6 | 250–260 | 19 |
| III | 8 > AC > 6 | 235–250 | 22 |
| IV | 8 > AC > 6 | 250–260 | 26 |
| V | 6 > AC | 235–250 | 30 |
| VI | 6 > AC | 250–260 | 32 | e) a discharge stage, during which the precondensates—while the temperature prevailing at the end of step d) is kept constant and the water vapor partial pressure prevailing at that time is at least maintained by feeding water vapor from the aforementioned water vapor generator into the autoclave and all the discharge lines and units communicating with it—can be supplied either in the molten state directly, or after passing through the solid state and optionally passing through other process steps, to a final reaction apparatus.

This is done for the condensates of amorphous polyamides or copolyamides, or those that are partially crystalline with a melting point below 280° C., by introduction at constant temperature and constant pressure into a third autoclave acting as a buffer vessel, and from there to the final reaction apparatus by means of a suitable metering and feed unit via a melt line.

The precondensates, at a pressure of at least 16 bar, of partially crystalline polyamides or copolyamides with a melting point of 280° C. and above are obtained in the form of solid particles by being sprayed into an inert cyclone or spray tower, or a comparable apparatus, and are optionally dried and after remelting are fed into the final reaction apparatus by a suitable metering and feed unit.

The process steps a) through e) according to the invention can be carried out selectively in the presence of from 0.005 to 1.5 weight %, referred to the total quantity of the polyamide-forming components, of an organic and/or inorganic phosphorus and/or tin and/or lead compound.

The process is applicable to the production of precondensates of partially crystalline or amorphous, thermoplastically processable, partially aromatic polyamides or copolyamides, which may comprise the following components:

A: from 0 to 100 mol % of at least one substituted or unsubstituted aromatic dicarboxylic acid having from 8 to 18 carbon atoms (based on the total quantity of all the dicarboxylic acids A and B), B: from 0 to 100 mol % of at least one dicarboxylic acid having from 6 to 36 carbon atoms, selected from the group of straight- or branch-chained aliphatic and cycloaliphatic dicarboxylic acids (based on the sum of A+B), C: from 0 to 100 mol % of at least one straight- or branch-chained aliphatic diamine having from 4 to 13 carbon atoms (based on the total quantity of all the diamines C+D+E), D: from 0 to 100 mol % of at least one cycloaliphatic diamine having from 6 to 26 carbon atoms (based on the sum of C+D+E), E: from 0 to 100 mol % of at least one araliphatic diamine having from 8 to 26 carbon atoms (based on the sum of C+D+E), wherein molar quantity of the dicarboxylic acids (A and B) is approximately equal to the molar quantity of the dimnines (C, D and E). One skilled in the art is aware that because of the volatility of individual monomers, the molar quantity of the dicarboxylic acids (A+B) and the molar quantity of the dimnines (C+D+E) can differ slightly from one another.

The prerequisite, however, is that at least one of the components A or E must be present.

Further components F and/or G may be added to the components from the group A–E:

F: from 0 to 80 mole % based to the total quantity of components from the group A, B, C, D, E, F, of at least one polyamide-forming monomer from the lactam group or ω-amino acid having from 6 to 12 carbon atoms, and G: from 0 to 6 mol %, referred to the total quantity of components from the group A, B, C, D, F, G, of at least one component selected from the group of aliphatic, cycloaliphatic or aromatic monoamines and aliphatic, cycloaliphatic or aromatic monocarboxylic acids.

Moreover, selectively, at least one catalyst and/or process- or applications-dictated additive may be present.

The partially crystalline or amorphous, thermoplastically processable, high-molecular, partially aromatic polyamides, which can be produced from the precondensates prepared according to the invention, may be employed to produce molding compositions for various processing techniques, e.g. various molding operations.

The process of the invention relates to amorphous and partially crystalline, partially aromatic polyamides or copolyamides. Because of this circumstance, it is appropriate to disclose discrimination criteria, which make it possible to assign a given polyamide composition to the group of amorphous or partially crystalline products, and optionally also to make predictions of its physical properties, and above all the melting point in the case of partially crystalline products and the glass transition temperature (Tg) of products of both groups. For the amorphous polyamides, valuable aid in this respect is offered for example by the article entitled "Structure Property Relationship in Amorphous Polyamides" by J. G. Dolden, in *Polymer* 1976, Vol. 17, pp. 875–892.

Predicting the partial crystallinity of partially aromatic copolyamides can be done with reliability at least for the group known as isomorphic copolyamides. Examples of such systems are PA-66/6T, PA-46/4T, PA-106/10T and PA-68/6BPDA based on hexamethylene amine (HMD)/adipic acid (ADS)/terephthalic acid (TPS), or tetramethylene diamine/ADS/TPS, or decamethylene diamine/ADS/TPS, and HMD/suberic acid/p-benzenediacetic acid (BPDA).

Further detail may be found in numerous publications, such as H. Plimmer et al in British Patent Application 604/49, Imperial Chemical Industries Ltd. (1949); R. Gabler, Swiss Patent Disclosure CH-A 280 367, inventa AG (1949); M. Levin and S.C. Temin, J. Polm. Sci. 49, 241–249 (1961); T. Sakashita et al in U.S. patent application Ser. No. 607,073, Mitsui Petrochemical Industries Ltd. (1985); S. Yamamoto and T. Tataka, European Patent Disclosure EP-A 0 449 466, Mitsui Petrochemical Industries, and British Patent Application 766 927, California Research Corporation (1945).

Information on non-isomorphic copolyamides, which in certain ranges of their composition may have amorphous structures, is found in some of the above publications and in A. J. Yu and R. D. Evans, J. Am. Chem. Soc. 20 5261–5365 (1959) and F. B. Cramer and R. G. Beamann, J. Polym. Sci., 21, 237–250 (1959).

If no conclusive answer as to whether a given polyamide is partially crystalline or amorphous can be found by consulting the above publications and other work cited in them, then a preliminary trial preparation of the applicable product in a smaller laboratory autoclave is of help.

To that end, the various components are mixed together with water, and after being flushed with an inert gas are heated in the closed autoclave. Once a product temperature of 200° to 230° C. is reached, water vapor is vented by opening the exhaust gas valve, and the pressure is relieved to ambient pressure while further heating is done to 250° to 290° C. However, this is at the cost of the fact that in the course of this procedure, higher-melting partially crystalline polyamides or copolyamides can become crystalline spontaneously under certain operating conditions and can block the agitator. The applicable product is taken from the autoclave and studied as to its Tg and its melting point, by means of differential scanning calorimetry (DSC). The DSC measurement is suitably repeated from once to twice with the same specimen, in order to assure that the thermal performance of the particular polyamide remains constant.

In the simplest case, instead of an autoclave, an agitatable and inert vessel, such as a glass bulb, operated without pressure can be used to carry out the preliminary trial. The temperature at the end of reaction should once again be between 250° and 290° C.

DETAILED DESCRIPTION OF EMBODIMENTS

The process according to the invention may be employed for the production of precondensates of arbitrary amorphous or crystalline partially aromatic polyamides or copolyamides. Accordingly, the choice of components A–G may be varied within a very wide range:

The substituted or unsubstituted aromatic dicarboxylic acids (A) having from 8 to 18 carbon atoms include the group comprising terephthalic acid, isophthalic acid, the alkyl- and aryl-substituted derivatives thereof, naphthalene dicarboxylic acids (-2,6-,-1,7-, etc.), diphenyldicarboxylic acids (-4,4-, 3,3-, etc.), and others. Terephthalic acid, isophthalic acid, 5-t-butylisophthalic acid and naphthalene-2,6-dicarboxylic acid) are preferred.

Among the straight- or branch-chain aliphatic or cycloaliphatic dicarboxylic acids (B) having from 3 to 36 carbon atoms, those preferred are adipic acid, suberic acid, azelaic acid, sebacic acid, dodecanedioic acid, brassylic acid, the trimethyl adipic acids, cis- and/or trans-cyclohexane-1,4-dicarboxylic acid, cis- and/or trans-cyclohexane-1,3-dicarboxylic acid, and dimerized fatty acids (such as Pripol 1013, Pripol 1009, Pripol 1008 made by UNICHEMA).

The straight- or branch-chain aliphatic diamines (C) having from 4 to 13 carbon atoms include the group comprising hexamethylene diamine (1,6-diaminohexane), 1,8-diaminooctane, 1,10-diaminodecane, 1,12-diaminododecane, 1,4-diaminobutane, 2,2-dimethyl-1,3-diaminopropane, 2,2,4- and/or 2,4,4-trimethyl-1,6-diaminohexane, 2-methyl-1,5-diaminopentane, 5-methyl-1,9-diaminononane, and others. Those preferred are 1,6-diaminohexane, 1,10-diaminodecane, 1,12-diaminododecane, and 2,2,4- or 2,4,4-trimethyl-1,6-diaminohexane.

Preferred representatives of the cycloaliphatic diamines (D) having from 6 to 26 carbon atoms are cis- and/or trans-1,4-diaminocylohexane, cis- and/or trans-1,3-diaminocylohexane, cis- and/or trans-1,4-bis(aminomethyl)cyclohexane, cis- and/or trans-1,3-bis(aminomethyl)cyclohexane, 3(4),8(9)-bis(aminomethyl) tricyclo-[5,2-1.0$^{2,6}$]-decane, 2(3),5(6)-bis(aminomethyl) norbornane, 1,8-diamino-p-menthane, and 3oamino-3,5,5'-trimethylcyclohexylamine.

As preferred araliphatic (aliphatic/aromatic or cycloaliphatic/aromatic) diamines (E) having from 8 to 26 carbon atoms, in which an amino group may be connected directly to the aromatic radical, 1,4-bis(aminomethyl) benzene, 1,3-bis(aminomethyl)benzene, and 4-(aminobenzyl)cyclohexylamine are used.

The preferred lactams or ω-amino acids (F) having from 6 to 12 carbon atoms are caprolactam, laurinlactam or ε-aminocaproic acid, ω-aminolauric acid and ω-aminoundecanoic acid, and 11- and 9-aminononanoic acid.

The preferred aliphatic, cycloaliphatic or aromatic monocarboxylic acids or monoamines (G) are acetic acid, propionic acid, butyric acid, caproic acid, lauric acid, stearic acid, 2-ethylhexanoic acid, cyclohexanoic acid, benzoic acid, the isomeric aminoalkanes having from 1 to 26 carbon atoms, such as n-butylamine, n-pentylamine, n-hexylamine, 2-ethylhexylamine, n-dodecylamine, n-tetradecylamine, n-hexadecylamine, n-octadecylamine, and cycloaliphatic and araliphatic monoamines such as cyclohexylamine, methyl- and dimethylcyclohexylarnines, benzylamine, and others.

With respect to the preferred embodiment of the method according to the invention, a distinction must be made between the following precondensates:

partially crystalline, partially aromatic polyamides or copolyamides having a melting point of 280° C. and higher, and the precondensates of amorphous polyamides or copolyamides, or those that are partially crystalline and melt at below 280° C.

However, in both cases, the process principle is the same, and in the phases that are decisive for the properties of the precondensates, that is, c) (reaction phase), d) (steady-state phase) and e) (discharge phase), the process comprises keeping the temperature of the precondensate melt and the water vapor partial pressure of the gas chamber in contact with it in the respective reaction or buffer autoclave at the appropriate predetermined values in a controlled manner from the end of reaction phase c) on. Maintaining the water vapor partial pressure is done by venting off water vapor from the respective autoclave or by controlled feeding of water vapor into the autoclave or autoclaves from a water vapor generator communicating with it or them.

The speed with which the venting of the water vapor can proceed depends very strongly on the size and construction of the autoclave. In autoclaves with internal heating coils, heating and degassing can certainly be done faster than in those with double-jacket heating. Larger autoclaves with otherwise the same design take longer to heat than smaller ones (because of the less favorable ratio between surface area and volume).

In general, it is true that phase c), for economic reasons, should be kept as short as possible, e.g. with respect to the times for phase c) given in the examples, it should be noted that at 60–180 minutes as indicated they are very short, and are appropriate for the autoclave size (2.4 or 20 liters in volume, empty). In a 1500-liter autoclave, to be realistic, a duration of 5–8 hours would have to be expected for phase c).

The steady-state phase d) must be maintained a period of at least 10 minutes and preferably at least 15 minutes, so that the precondensate reaches a virtually stable state, in which no further substantial change in its properties occurs, and especially in its -average molecular weight and the properties directly dependent on it. This condition is not met by phase c), because here the values for T and p, and hence the properties of the product, vary constantly.

During the discharge phase e), care must be taken that not only the autoclave but all the discharge lines and discharge units communicating with it be kept controlled at the same temperature and at least at the same water vapor partial pressure as in the autoclave.

The water vapor partial pressure should be regulated, before the end of the reaction phase c), to the particular total pressure measured in the gas chambers. The very complicated precise measurement of the water vapor partial pressure becomes unnecessary, because the partial pressures of the other gas ingredients, such as inert gas (e.g. nitrogen), relatively volatile raw materials (such as hexamethylene diamine) or the possible products of decomposition forming from the raw materials (such as $NH_3$ from amines or $CO_2$ from carboxylic acids), is negligibly small compared with the total pressure. The proportion of inert gas—normally, nitrogen—decreases in any case sharply because of the requisite controlled opening of the pressure relief valve at the reaction autoclave during reaction phase c), and is almost completely positively displaced by the water vapor originating from the salt forming step a) and formed in the reaction.

The aforementioned distinction between precondensates of partially crystalline, partially aromatic polyamides or copolyamides having a melting point of 280° C. and above, on the one hand, and the precondensates of amorphous polyamides or copolyamides on the other, that is those that are partially crystalline and melt at below 280° C., relates to the method parameters in steps c) through e) and the process sequences from the final precondensate to the corresponding high-molecular polyamide or copolyamide.

The preparation of the first-named group of precondensates is subject to restrictions in the sense that the precondensate temperature during steps c) to e) must not exceed 265° C., and in the course of these process steps certain peripheral conditions with respect to the minimum water vapor partial pressure to be employed must be observed. The lower limits given above for the water vapor partial pressure depend in turn on the temperature or on the temperature range selected, and surprisingly also depend on the amide group concentration AC (for calculation of this, see below) of the applicable polyamide or copolyamide.

A precise functional relationship between the minimum necessary water vapor partial pressure, the precondensate temperature, and the amide group concentration cannot be given. However, it has been found, as will also be illustrated in the examples, that if the aforementioned peripheral conditions are adhered to, a reliable, disruption-free production of the precondensates of partially crystalline, partially aromatic polyamides or copolyamides that also melt at above 280° C. is possible. From the minimum water vapor pressures required, which are each associated with the various temperature ranges, it can be concluded that higher temperatures also require higher pressures. At temperatures above 260° C., still higher pressures than those shown in Table I must therefore be employed.

However, no attempt has been made to list the minimum pressures for instance for the temperature range of 260°–170° C., because first, no certain data are available (except that at 270° C., 30 bar is adequate for none of the cases I, II and III in Table I);

second, pressures higher than 30 bar can be achieved in large autoclaves only at very high technological effort and expense.

Nevertheless, for the high melting products (melting point >280° C.), the maximum allowable temperature for the reactor content during phases c) and d) is believed to be 265° C. This additional condition reflects nothing more than actual conditions in an autoclave process. For maintaining the particular minimum required water vapor partial pressure, a water vapor generator—from which in process steps c) through e), water vapor can be fed in controlled fashion into the autoclave and the discharge lines and units communicating with it—is the most suitable means. This provision is absolutely necessary in the discharge phase e), because the pressure drop in the gas space above the precondensate melt, which necessarily occurs from the increase in volume, must be compensated for.

During phases c) and d) an intervention needs then to be made, by connecting the steam generator, if leaks or defective pressure relief of the water vapor causes the water vapor partial pressure to threaten to drop below the lower limit that is supposed to be adhered to. As soon as operating states occur in the process steps in which either the water vapor partial pressure becomes too low or the precondensate temperature is too high, or even both occur, then the danger exists that the applicable precondensate will solidify rapidly and can no longer be discharged from the reactor via a melt line. The causes of these solidification phenomena, which are to be avoided in all circumstances, are unknown. Nor does the prior art provide any teaching in this respect at any point. However, in this connection, the only significant fact is that this problem has been recognized, and that a means for overcoming it is provided according to the method of the present invention.

Instead of a water vapor generator, a direct injection of water by means of a suitably controlled metering pump into the reactor is also possible. However, operating in that way has the disadvantage that because of the evaporation of the water that occurs in the reactor, energy is consumed, and consequently the temperature of the reactor content is lowered in a way that is very difficult to control. Accordingly, this option is not preferred.

The precondensates having a melting point of 280° C. and above and higher-melting polyamides or copolyamides are discharged by being sprayed into an inert, optionally cooled cyclone or spray tower or some comparable apparatus; some of the water dissolved in the precondensate melts suddenly evaporates, and the precondensates are then in a finely dispersed, crystallized form.

Depending on the amount of water evaporated in this operation, the precondensate particles are simultaneously cooled, often to a pronounced extent.

By means of a suitable feed system, the finely dispersed precondensate composition, optionally after further mechanical comminution and/or drying, is suitably re-melted and delivered, using a suitable metering and feed unit, to a continuously operating mechanically driven final reaction apparatus.

In the precondensates of amorphous polyamides or copolyamides, or those that are partially crystalline, partially aromatic and melt at below 280° C., there is greater freedom in terms of the choice of the temperature and the water vapor partial pressure in process steps c) through e) than is the case with the precondensation of products that melt at 280° C. and higher.

In steps c) through e), the precondensate temperature may be varied between 230° C. and 320° C.; for the subgroup of precondensates involving the partially crystalline polyamides or copolyamides (having a melting point below 280° C.), it is appropriate to adjust the precondensate temperature to be higher than the applicable melting temperature.

The water vapor partial pressure may also be varied over a comparably wide range in steps c) through e). Pressures of from 1.5 to 20 bar are usable. Preferably, work is done at water vapor partial pressures below 15 bar. The pressure range from 2 to 10 bar is especially preferably employed, in order to keep the water content of the precondensate melts as low as possible, and to assure high efficiency of the final reaction apparatus.

The precondensates of amorphous polyamides or copolyamides, or those that are partially crystalline and melt at below 280° C., are then transferred as a melt from the reactor into an autoclave, serving as a buffer vessel and operated under the same conditions as the reactor, and from there are supplied via a melt line directly to the final reaction apparatus, by means of a suitable feeding and metering apparatus, such as a spinning pump. The provisions for maintaining the water vapor partial pressure in the reactor and in the buffer autoclave are the same as those described already above.

All the process steps according to the invention may be carried out with from 0.005 to 1.5 weight %, based on the total quantity of all the polyamide-forming components, of an inorganic and/or organic phosphorus and/or tin and/or lead compound as a catalyst. Among the phosphorus compounds that may be employed are phosphoric acid, phosphorous acid, hypophosphorous acid, phenylphosphonic acid, phenylphosphinic acid, and salts thereof having 1- to 3-valent cations (such as the sodium, potassium, magnesium, calcium, zinc or aluminum cation) esters of phosphoric or phosphorous acid (such as triphenylphosphate, triphenylphosphite, tris-(nonylphenyl) phosphite), and others.

The tin compounds that may be employed include the following, for example: tin (II) oxide, tin (II) hydroxide, tin (II) salts of mono- or multivalent carboxylic acids, such as tin (II) dibenzoate, tin (II) di-(2-ethylhexanoate), tin (II) oxalate, and also dibutyltin oxide, butylstannic acid ($H_9C_4$—SnOOH), dibutyltindilaurate, and others. Among the lead compounds that may be employed are, for example, lead (II) oxide, lead (II) hydroxide, lead (II) acetate, basic lead (II) acetate, lead (II) carbonate, and others.

Besides compounds of phosphorus, tin and lead, which can have a stabilizing effect on the precondensates and the applicable polyamides and/or that catalyze the formation of amide compounds, the usual additives may be used in all the process steps. These include antioxidants, such as sterically hindered phenol derivatives, aromatic amines, combinations of copper salts and alkali bromides or alkali iodides, light-protection agents, such as benzotriazole derivatives, 2,2,6,6-tetraalkylpiperidine derivatives, nickel chelating complexes, and the usual process additives based on fatty acid esters, fatty acid amides, fatty acid salts having from 1- to 3-valent cations, fatty alcohols, waxes, and others.

Finally, for the case of partially crystalline polyamides or copolyamides, the usual nucleation agents and crystallization accelerators are used in the usual quantities in all the process steps: these include finely dispersed minerals which are largely insoluble in the applicable precondensates and polyamides, such as mica, kaolin, talc, montmorillonite, wollastonite and comparable materials, but also organic substances, such as polyamide-2.2.

The amorphous or partially crystalline, thermoplastically processable, partially aromatic polyamides or copolyamides that are accessible from precondensates by the method of the invention may be employed to produce molded parts by means of arbitrary suitable processing techniques. Suitable processing techniques include injection molding, multicomponent injection molding, injection di-cast welding, extrusion, coextrusion, blow forming, deep drawing, and others. For this purpose, reinforcing agents and fillers may be added to the aforementioned polyamides or copolyamides, examples being glass fibers, carbon fibers, mineral reinforcements and fillers, and other modification agents, such as flame-retardant additives or antistatic agents.

The following examples will explain the invention.

EXAMPLES

The following abbreviations are used:
66: hexamethylene-adipamide units
6T: hexamethylene-terephthalamide units
6I: hexamethylene-isophthalamide units
106: decamethylene-adipamide units
10T: decamethylene-terephthalamide units
12T: dodecamethylene-terephthalamide units Examples 1.1–1.3

(CoPA 6T/6I (0.3/0.7 mol/mol; amorphous))
Salt forming phase (process step a)):

In a 2.4-1 double jacket reactor (steel), 294.0 g (2.53 mol) of hexamethylene diamine is placed, in the form of a 50% aqueous solution. After the addition of 124.6 g (0.75 mol) of terephthalic acid, 290.8 g (1.75 mol) of isophthalic acid and 0.1 g of $H_3PO_3$, the reactor is closed. The reaction mixture is heated to 120° C. (pressure=1 bar). It is stirred for 30 minutes at 120° C. and 1 bar, resulting in a clear solution of in-situ-formed nylon salts.

Transfer (process step b)):
Omitted in the case of the 2.4–1 autoclave

Reaction phase (process step c)):
The temperature of the reaction mixture from process step a) is raised in increments to 245° C. As soon as the pressure in the reactor has reached a value of 19 bar, enough water vapor is withdrawn from the reaction mixture, via a regulatable valve, so that the pressure is kept constant at 19 bar. This pressure is maintained for 1 hour for each example. Next, the pressure in the autoclave is reduced by controlled pressure relief to 6 bar (Example 1.1), 4 bar (Example 1.2) and 3 bar (Example 1.3). Since phase c) is a dynamic process, the values for T and p given in the examples that follow always correspond to the particular final state of that phase.

Steady-state phase (process step d)):
The conditions (245° C. and 6 bar; 245° C. and 4 bar; 245° C. and 3 bar) established at the end of the reaction phase (method step c)) are maintained for 40 minutes. During this period of time, samples of the applicable precondensate are taken at the beginning and every 10 minutes, in order to measure the relative viscosity of the solution ($\eta_{rel}$). The results are summarized in Table II.

TABLE II

Relative Viscosity of Precondensates During the Steady-state Phase ($\eta_{rel}$ (0.5% in m-cresol))

| Duration of the Steady-State Phase | Example 1.1 - 6 bar - | Example 1.2 - 4 bar - | Example 1.3 - 3 bar - |
|---|---|---|---|
| Start | 1.090 | 1.253 | 1.282 |
| 10 minutes | 1.092 | 1.265 | 1.294 |
| 20 minutes | 1.092 | 1.271 | 1.305 |
| 30 minutes | 1.092 | 1.272 | 1.307 |
| 40 minutes | 1.093 | 1.272 | 1.310 |

Discharge phase (process step e)):
During the discharge phase, which is 2 minutes long in each case, and which takes place under the conditions of process step d), a sample of the applicable precondensate is taken at the beginning and at the end, and the relative viscosity of the solution of the sample is determined.

TABLE III

Relative Viscosity of Precondensates at Start and End of the Discharge Phase $\eta_{rel}$ (0.5% in m-cresol)

| Discharge phase | Example 1.1 | Example 1.2 | Example 1.3 |
|---|---|---|---|
| Begin | 1.093 | 1.274 | 1.311 |
| End | 1.092 | 1.274 | 1.312 |

The results of Example 1.1–1.3 show how the viscosity of the polymer precondensate can be adjusted via the water vapor pressure during the steady-state phase (process step d)) and the discharge phase (process step e)). Once the steady-state phase ends, the reaction mixture has attained a virtually stable state.

In this form, the applicable precondensates can be supplied as a melt directly to a final reaction apparatus. The constancy of the precondensate quality assures that the polycondensation in a final reaction also produces products of constant quality.

Examples 2.1–2.3
(CoPA 6T/6I (0.3/0.7 mol/mol; amorphous))
Reaction volume = 130 liter
Weight: 16.180 kg (139.23 mol) hexamethylene amine
16.165 kg (97.30 mol) isophthalic acid
6.928 kg (41.70 mol) terephthalic acid
0.008 kg $H_3PO_3$
16.000 kg water (29 weight %)

Salt forming phase (process step a)):

| | |
|---|---|
| Temperature: | 120° C. |
| Pressure: | 1 bar |
| Residence time: | 2 hours |

Transfer phase (process step b)):

| | |
|---|---|
| Temperature: | 120° C. |
| Pressure: | 1 bar |

Reaction phase (process step c)):

| | |
|---|---|
| Temperature: | 245° C. (at the end of the reaction phase) |
| Pressure: | 19 bar |
| Residence time: | 3 hours (at the end of the reaction phase) |
| Pressure relief to: | 4 bar |

Steady-state phase (process step d)):

| | |
|---|---|
| Temperature: | 245° C. |
| Pressure: | 4 bar |
| Residence time: | 20 minutes |

Discharge phase (process step e)):

| | |
|---|---|
| Temperature: | 245° C. |
| Pressure: | 4 bar |

Three identical batches are processed. The viscosities of the solutions in Table IV illustrate the replicability of a desired precondensate viscosity, which is maintained over a 20-minute steady-state phase and over the discharge phase.

TABLE IV

Replicability of Target Viscosities

| | Example 2.1 | Example 2.2 | Example 2.3 |
|---|---|---|---|
| $\eta_{rel}$ (0.5% in m-cresol) | 1.265 | 1.252 | 1.253 |

Example 3.1, 3.2
PA 12 T;
partially crystalline (AC = 6.06 mmol/g)
Melting point: 301° C.
Reaction volume = 2.4 liter
Weight: 506.9 g (2.53 mol) dodecamethylene diamine
415.4 g (2.50 mol) terephthalic acid
0.1 g $H_3PO_3$
500 g $H_2O$ (35 weight %)

Salt forming phase (process step a)):

| | |
|---|---|
| Temperature: | 180° C. |
| Pressure: | 8 bar |
| Residence time: | 30 minutes |

Transfer phase (process step b)):

Omitted for 2.4-liter autoclaves

TABLE IV-continued

Replicability of Target Viscosities

Reaction phase (process step c)):

| | |
|---|---|
| Temperature: | 245° C. (at the end of the reaction phase) |
| Pressure: | 27 bar (at the end of the reaction phase) |
| Residence time: | 1 hour |

Example 3.1

A controlled incremental pressure relief to a pressure of 6 bar (analogous to Example 1.1) fails, since the reaction mixture crystallizes spontaneously at approximately 20 bar and causes the stoppage of the agitator.

Steady-state phase (process step d)):
Example 3.2:

| | |
|---|---|
| Temperature: | 245° C. |
| Pressure: | 27 bar |
| Residence time: | 20 minutes |

Discharge phase (process step e)):
Example 3.2:

| | |
|---|---|
| Temperature: | 245° C. |
| Pressure: | 27 bar |
| Product: | $\eta_{rel}$ = 1.071 (0.5% in m-cresol) |

Examples 4.1, 4.2
CoPA 10T/106 (0.9/0.1 mol/mol)
partially crystalline (AC = 6.67 mmol/g)
Melting point: 299° C.
Reaction volume = 2.4 l
Weight: 436.0 g (2.530 mol) decamethylene diamine
373.8 g (2.25 mol) terephthalic acid
36.5 g (0.25 mol) adipic acid
0.2 g $NaH_2PO_2xH_2O$
400 g $H_2O$ (32 weight %)

Salt forming phase (process step a)):

| | |
|---|---|
| Temperature: | 180° C. |
| Pressure: | 8 bar |
| Residence time: | 30 minutes |

Transfer phase (process step b)):

Omitted

Reaction phase (process step c)):

| | |
|---|---|
| Temperature: | 250° C. (at the end of the reaction phase) |
| Pressure: | 32 bar (at the end of the reaction phase) |
| Residence time: | 1 hour |

Example 4.1

A controlled incremental pressure relief to a pressure of 6 bar (analogous to Example 1.1) fails, since the reaction mixture crystallizes spontaneously at approximately 14 bar and causes the stoppage of the agitator.

Steady-state phase (process step d)):
Example 4.2:

| | |
|---|---|
| Temperature: | 250° C. |
| Pressure: | 32 bar |
| Residence time: | 20 minutes |

Discharge phase (process step e)):

Example 4.2:

| | |
|---|---|
| Temperature: | 250° C. |
| Pressure: | 32 bar |
| Product: | $\eta_{rel} = 1.071$ (0.5% in m-cresol) |

Examples 3.1 and 3.2, and 4.1 and 4.2 (partially crystalline PA and CoPA, respectively), in comparison to Example 1 (amorphous CoPA), show that with partially crystalline PA or CoPA, at the end of the steady-state phase, the pressure cannot be reduced, since that causes uncontrollable crystallization and hence blockage of the agitator.

The discharge phase must therefore suitably be done under the conditions of the steady-state phase, when partially crystalline PA or CoPA with a melting point of more than 280° C. is used.

Examples 5.1–5.3
CoPA 6T/66 (0.6/0.4 mol/mol)
partially crystalline (AC = 8.40 mmol/g)
Melting point: 316° C.

| | |
|---|---|
| Reaction volume = | 20 liter |
| Weight: | 2700 g (23.234 mol) hexamethylene diamine |
| | 2310 g (13.904 mol) terephthalic acid |
| | 1350 g (9.238 mol) adipic acid |
| | 20 g (0.164 mol) benzoic acid |
| | 2 g $NaH_2PO_2 \cdot xH_2O$ |
| | 2000 g $H_2O$ (24 weight %) |

Salt forming phase (process step a)):

| | |
|---|---|
| Temperature: | 180° C. |
| Pressure: | 6 bar |
| Residence time: | 2 hours |

Transfer phase (process step b)):

| | |
|---|---|
| Temperature: | 180° C. |
| Pressure: | 6 bar |

Reaction phase (process step c)):

| | |
|---|---|
| Temperature: | 241° C. (Example 5.1) |
| | 243° C. (Example 5.2) |
| | 247° C. (Example 5.3) |
| | (at the end of the reaction phase) |
| Pressure: | 23 bar (Examples 5.1–5.3) |
| | (at the end of the reaction phase) |
| Residence time: | 90 minutes |

Steady-state phase (process step d)):

| | |
|---|---|
| Temperature: | 241° C. (Example 5.1) |
| | 243° C. (Example 5.2) |
| | 247° C. (Example 5.3) |
| Pressure: | 23 bar (Examples 5.1–5.3) |
| Residence time: | 30 minutes |

Discharge phase (process step e)):

| | |
|---|---|
| Temperature: | 241° C. (Example 5.1) |
| | 243° C. (Example 5.2) |
| | 247° C. (Example 5.3) |
| Pressure: | 23 bar (Examples 5.1–5.3) |
| Product: | |

| | Example 5.1 | Example 5.2 | Example 5.3 |
|---|---|---|---|
| $\eta_{rel} = $ (0.5% in m-cresol) | 1.125 | 1.136 | 1.160 |

The Examples 5.1–5.3 show a desired viscosity of the polymer precondensate can be established via a targeted temperature adjustment in both the reaction phase and the steady-state phase.

Examples 6.1–6.3
CoPA 6T/66 (0.6/0.4 mol/mol)
partially crystalline (AC = 8.40 mmol/g)
Melting point: 316° C.

| | |
|---|---|
| Reaction volume = | 20 liter |
| Weight: | identical to Example 5 |

Salt forming phase (process step a)):

identical to Example 5

Transfer phase (process step b)):

identical to Example 5

Reaction phase (process step c)):

| | |
|---|---|
| Temperature: | 241° C. (at the end of the reaction phase) |
| Pressure: | 23 bar (Example 6.1) |
| | 22 bar (Example 6.2) |
| | 20 bar (Example 6.3) |
| Residence time: | 90 minutes |

Steady-state phase (process step d)):

| | |
|---|---|
| Temperature: | 241° C. |
| Pressure: | 23 bar (Example 6.1) |
| | 22 bar (Example 6.2) |
| | 20 bar (Example 6.3) |
| Residence time: | 30 minutes |

Discharge phase (process step c)):

| | |
|---|---|
| Temperature: | 241° C. |
| Pressure: | 23 bar (Example 6.1) |
| | 22 bar (Example 6.2) |
| | 20 bar (Example 6.3) |
| Residence time: | 30 minutes |

Discharge phase (process step e)):

| | |
|---|---|
| Temperature: | 241° C. |
| Pressure: | 23 bar (Example 6.1) |
| | 22 bar (Example 6.2) |
| | 20 bar (Example 6.3) |
| Product: | |

| | Example 6.1 | Example 6.2 | Example 6.3 |
|---|---|---|---|
| $\eta_{rel} = $ (0.5% in m-cresol) | 1.128 | 1.145 | 1.157 |

The Examples 6.1–6.3 show a desired viscosity of the polymer precondensate can be established via a predetermined maximum pressure in both the reaction phase and the steady-state phase.

Examples 7.1, 7.2
CoPA 6T/66 (0.6/0.4 mol/mol)
partially crystalline (AC = 8.40 mmol/g)
Melting point: 316° C.

| | |
|---|---|
| Reaction volume = | 20 liter |
| Weight: | identical to Example 5 |

Salt forming phase:

identical to Example 5

Transfer phase:

identical to Example 5

Reaction phase:

| | |
|---|---|
| Temperature: | 243° C. (at the end of the reaction phase) |
| Pressure: | 2.3 bar (at the end of the reaction phase) |
| Residence time: | 90 minutes (Example 7.1) |
| | 150 minutes (Example 7.2) |

-continued

Steady-state phase:

| | |
|---|---|
| Temperature: | 243° C. |
| Pressure: | 23 bar |
| Residence time: | 30 minutes (Example 7.1) |
| | 30 minutes (Example 7.2) |

Discharge phase:

| | |
|---|---|
| Temperature: | 243° C. |
| Pressure: | 23 bar |

Product:

| | Example 7.1 | Example 7.2 |
|---|---|---|
| $\eta_{rel}$ = (0.5% in m-cresol) | 1.131 | 1.173 |

The Examples 7.1 and 7.2 show a desired viscosity of the polymer precondensate can be established via controlling the dwell time in the reaction phase.

Example 8
CoPA 6T/66 (0.6/0.4 mol/mol)
partially crystalline (AC = 8.40 mmol/g)
Melting point: 316° C.
Reaction volume = 20 liter
Weight: identical to Example 5

Salt forming phase:

identical to Example 5
Transfer phase:

identical to Example 5
Reaction phase:

| | |
|---|---|
| Temperature: | 255° C. (at the end of the reaction phase |
| Pressure: | 27 bar (at the end of the reaction phase) |
| Residence time: | 90 minutes |
| Pressure relief to: | 17 bar |

Steady-state phase:

| | |
|---|---|
| Temperature: | 255° C. |
| Pressure: | 17 bar |
| Residence time: | 30 minutes |

Discharge phase:

| | |
|---|---|
| Temperature: | 255° C. |
| Pressure: | 17 bar |

Product:

Product partially crystallized in the reactor. Discharge of approximately 50% of the expected quantity of product not possible.
Remaining product: $\eta_{rel}$ = 1.211 (0.5% in m-cresol)

Example 8 shows that if the required $H_2O$ partial pressure per Table I (Table II) is not attained, the reaction mixture crystallizes uncontrollably in the autoclave and can no longer be completely discharged from the reaction vessel.

Examples 9.1–9.3
CoPA 6T/6I (0.7/0.3 mol/mol)
partially crystalline (AC = 8.12 mmol/g)
Melting point: 320° C.
Reaction volume = 20 liter
Weight: 2500 g (21.513 mol) hexamethylene diamine
2478 g (14.915 mol) terephthalic acid
1062 g (6.392 mol) isophthalic acid
15 g (0.250 mol) acetic acid
2 g $NaH_2PO_2xH_2O$
2000 g $H_2O$ (25 weight %)

Salt forming phase:

| | |
|---|---|
| Temperature: | 180° C. |
| Pressure: | 6 bar |
| Residence time: | 150 minutes |

Transfer phase:

| | |
|---|---|
| Temperature: | 180° C. |
| Pressure: | 6 bar |

Reaction phase:

| | |
|---|---|
| Temperature: | 243° C. (at the end of the reaction phase |
| Pressure: | 23 bar (at the end of the reaction phase) |
| Residence time: | 120 minutes |

Steady-state phase:

| | |
|---|---|
| Temperature: | 243° C. |
| Pressure: | 23 bar |
| Residence time: | 30 minutes |

Discharge phase:

| | |
|---|---|
| Temperature: | 243° C. |
| Pressure: | 23 bar |

Product:

Three identical batches were prepared. The precondensate viscosities given below illustrate the good replicability of a desired precondensate quality, under identical reaction conditions.

| | Example 9.1 | Example 9.2 | Example 9.3 |
|---|---|---|---|
| $\eta_{rel}$ = (0.5% in m-cresol) | 1.092 | 1.085 | 1.088 |

The relative solution viscosities of the products are measured in accordance with DIN 53727 in 0.5% solutions in m-cresol at 20° C. The measurement of the melt temperatures (maximums) is done with the aid of a DSC device, model 990, made by DuPont. In each case what was evaluated was the second heating run, carried out at a heating rate of 10° C./min.

The amide concentrations AC (in mmol/g) given in the cases of polyamides or copolyamides with a melting point above 280° C. were calculated, each for a 100% conversion of the amide-forming components, by the following general formula:

$$AK = 1000 \left( \Sigma \frac{n_{A/C} \cdot m_{A/C}}{M_{A/C}} + \Sigma \frac{m_L}{M_L} + \Sigma \frac{m_{AS}}{M_{AS}} \right) \cdot$$

$$\left( \Sigma m_C + \Sigma m_A + \Sigma m_L + \Sigma m_{AS} - M_{H_2O} \cdot \left( \Sigma \frac{n_{A/C} \cdot m_{A/C}}{M_{A/C}} + \Sigma \frac{m_{AS}}{M_{A/S}} \right) \right)^{-1}$$

In which:
$m_{A/C}$ the mass $m_A$ of the amines or $m_C$ of the carboxylic acids in g,
$M_{A/C}$ the molar masses $M_A$ of the amines or $M_C$ of the carboxylic acid in g/mol
$n_{A/C}$ the functionality $n_A$ of the amines or $n_C$ of the carboxylic acids: 1 or 2,
$m_L$ the masses of the lactams in g,
$M_L$ the molar masses of the lactams in g/mol,
$m_{AS}$ the masses of amino acids in g,
$M_{AS}$ the molar masses of amino acids in g/mol°,
$M_{H2O}$ the molar mass of water in g/mol.

The factor 1000 is used for recalculation mol/g to mmol/g. The terms referring to lactams and amino acids are omitted in the examples to which that applies.

For the term $$\Sigma \frac{n_{A/C} \cdot m_{A/C}}{M_{A/C}},$$

the term $$\Sigma \frac{n_A \cdot m_A}{M_A}$$

is used if the sum of carboxyl groups from the carboxylic acids is higher than the total number of amino groups from the amines. Conversely, the following term is calculated:

$$\Sigma \frac{n_C \cdot m_C}{M_C}$$

TABLE V

Temperature and Pressure Ranges of Various Copolyamides

| CoPA (molar ratio) | Amide concentration AC [mmol/g] | Product temperature range [°C.] | Pressure range [bar] |
|---|---|---|---|
| 6T/66 (0.55:0.45) | 8.44 | 243–250 | 16–23 |
| 6T/6I (0.7:0.3) | 8.12 | 243–250 | 16–23 |
| 10T/106 (0.85–0.15) | 6.69 | 243–250 | 22–26 |
| 12T | 6.06 | 243–250 | 22–26 |
| 4T | 9.17 | | |

TABLE VI

Amide concentration (2 amide groups per repetition unit), various polyamides in mmol/g of polymer

| CoPA | Formula | Molecular weight | Amide concentration mmol/g |
|---|---|---|---|
| 6I and 6T | —[N(H)—(CH₂)₆—N(H)—C(O)—C₆H₄—C(O)]ₙ— | 246 | 8.12 |
| 66 | —[N(H)—(CH₂)₆—N(H)—C(O)—(CH₂)₄—C(O)]ₙ— | 226 | 8.85 |
| 10T | —[N(H)—(CH₂)₁₀—N(H)—C(O)—C₆H₄—C(O)]ₙ— | 392 | 6.62 |
| 106 | —[N(H)—(CH₂)₁₀—N(H)—C(O)—(CH₂)₄—C(O)]ₙ— | 282 | 7.09 |
| 12T | —[N(H)—(CH₂)₁₂—N(H)—C(O)—C₆H₄—C(O)]ₙ— | 330 | 6.06 |
| 4T | —[N(H)—(CH₂)₄—N(H)—C(O)—C₆H₄—C(O)]ₙ— | 218 | 9.17 |

TABLE VI-continued

Amide concentration (2 amide groups per repetition unit), various polyamides in mmol/g of polymer

| CoPA | Formula | Molecular weight | Amide concentration mmol/g |
|---|---|---|---|
| 46 | 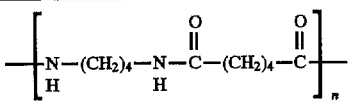 | 198 | 10.1 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A process for producing a precondensate of a partially crystalline or amorphous, thermoplastically processable, partially aromatic polyamide or copolyamide, which is based on monomer units selected form the group consisting of A, B, C, D, E, as well as optionally the components F and G, as follows:

A: from 0 to 100 mol % of at least one substituted or unsubstituted aromatic dicarboxylic acid having from 8 to 18 carbon atoms (based on the total quantity of all the dicarboxylic acids A+B), B: from 0 to 100 mol % of at least one dicarboxylic acid having from 6 to 36 carbon atoms, selected from the group consisting of straight- or branch-chained aliphatic and cycloaliphatic dicarboxylic acids (based on the sum of A+B), C: from 0 to 100 mol % of at least one straight-or branch-chained aliphatic diamine having from 4 to 13 carbon atoms (based on the total quantity of all the diamines C+D+E), D: from 0 to 100 mol % of at least one cycloaliphatic diamine having from 6 to 26 carbon atoms (based on the sum of C+D+E);

E: from 0 to 100 mol % of at least one araliphatic diamine having from 8 to 26 carbon atoms (referred to the sum of C+D+E), wherein the molar quantity of the dicarboxylic acids (A and B) is approximately equal to the molar quantity of the dimmines (C, D and E), and wherein at least one of A and E is present, and F: from 0 to 80 mol %, referred to the total quantity of components from the group A, B, C, D, E, F, of at least one polyamide-forming monomer from the lactam group or x-amino acid having from 6 to 12 carbon atoms, and G: from 0 to 6 mol %, referred to the total quantity of components from the group A, B, C, D, F, G, of at least one compound selected from the group consisting of aliphatic, cycloaliphatic or aromatic monoamines and aliphatic, cycloaliphatic or aromatic monocarboxylic acids, wherein optionally at least one catalyst is present; wherein the method comprises:

a) a salt forming stage for producing salt(s) of diamine(s) and dicarboxylic acid(s) in a 5 to 50 weight % aqueous solution containing the components, which is carried out optionally with partial pre-reaction to make low-molecular oligomides at temperatures between about 120° C. and 220° C. and at pressures of up to 23 bar, b) optionally, transfer of the solution from step a) to a second reaction vessel, or an agitated autoclave under a temperature range of from 235°–260° C. and a minimum $P_{H2O}$ of from 16 to 32 bar, c) a reaction phase, during which conversion to the precondensate is continued by heating the reactor content to a temperature range of from 235°–260° C. and by adjustment of the water vapor partial pressure to a minimum of from 16 to 32 bar, which water vapor pressure is maintained by venting of water vapor or optionally feeding in of water vapor from a water vapor generator which is connected to the autoclave, d) a steady state phase maintained for at least 10 minutes, in which the temperature of the reactor content and the water vapor partial pressure are adjusted to a temperature of from 235°–260° C. and a minimum $P_{H2O}$ of from 16 to 32 bar, with the specification that in the case of precondensates of partially crystalline polyamides or copolyamides having a melting point of 280° C. and higher (maximum melting point, measured by differential scanning calorimetry), the temperature of the reactor content during phase d) and phase c), must not exceed 265° C., and that for the partially crystalline polyamides or copolyamides during phase d) and phase c), the following peripheral conditions (Table I) must be adhered to with respect to the dependency of the minimum water vapor partial pressure $P_{H2O}$ (minimum) to be employed on the temperature of the reactor content and on the amide group concentration of the polymer (in mmol/g, calculated from a condensed-out polymer with an average molecular weight of at least 5000 g/mol),

TABLE I

| Amide Concentration (AC) [mmol/g] | Temperature range [°C.] | $P_{H2O}$ (minimum) [bar] |
|---|---|---|
| I  10 > AC > 8 | 235–250 | 16 |
| II 10 > AC > 6 | 250–260 | 19 |

TABLE I-continued

|   | Amide Concentration (AC) [mmol/g] | Temperature range [°C.] | $P_{H2O}$ (minimum) [bar] |
|---|---|---|---|
| III | 8 > AC > 6 | 235–250 | 22 |
| IV | 8 > AC > 6 | 250–260 | 26 |
| V | 6 > AC | 235–250 | 30 |
| VI | 6 > AC | 250–260 | 32 | e) a discharge phase, during which the precondensate, while the temperature prevailing at the end of phase d) is kept constant and said water vapor partial pressure is maintained, is supplied to a final reaction apparatus, either in the molten state via a buffer device directly or via a separator device and passage through the solid state;

wherein in the discharge step e), prior to the introduction into a final reaction apparatus, the precondensate of amorphous polyamide or copolyamide or partially crystalline polyamide or copolyamide with a melting point below 280° C., is transferred to an inert buffer vessel that is at constant temperature and constant pressure and from these is metered or fed onward, or the precondensate of partially crystalline polyamide or copolyamide melting at 280° C. and higher is sprayed at a pressure of at least 16 bar into an inert separator device and obtained, in the form of solid particles, selectively dried and or comminuted.

2. The process of claim 1 wherein the separation of the precondensates of partially crystalline polyamides or copolyamides melting at 280° C. and higher is done in a cyclone or spray tower.

3. The process of claim 1 wherein from 0.005 to 1.5 weight % of catalyst, referred to the total quantity of components, selected from the group consisting of an organic or inorganic compound of phosphorus, tin and lead, is present in the reaction medium.

4. The process of claim 1 wherein the separation of the precondensates of partially crystalline polyamides or copolyamides melting at 280° C. and higher is done in a cyclone or spray tower.

5. The process of claim 4 wherein from 0.005 to 1.5 weight % of catalyst, referred to the total quantity of components, selected from the group consisting of an organic or inorganic compound of phosphorus, tin and lead, is present in the reaction medium.

* * * * *